US012652140B2

(12) United States Patent
Yao et al.

(10) Patent No.: US 12,652,140 B2
(45) Date of Patent: Jun. 9, 2026

(54) SYSTEMS AND METHODS FOR SOUNDING REFERENCE SIGNAL ENHANCEMENT

(71) Applicant: ZTE Corporation, Shenzhen (CN)

(72) Inventors: Ke Yao, Shenzhen (CN); Bo Gao, Shenzhen (CN); Shujuan Zhang, Shenzhen (CN); Meng Mei, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 357 days.

(21) Appl. No.: 18/393,012

(22) Filed: Dec. 21, 2023

(65) Prior Publication Data

US 2024/0243871 A1     Jul. 18, 2024

Related U.S. Application Data

(63) Continuation of application No. PCT/CN2023/072997, filed on Jan. 18, 2023.

(51) Int. Cl.
H04W 4/00          (2018.01)
H04L 5/00          (2006.01)

(52) U.S. Cl.
CPC .......... H04L 5/0051 (2013.01); H04L 5/0012 (2013.01)

(58) Field of Classification Search
CPC ... H04L 5/0051; H04L 5/0012; H04L 5/0048; H04L 5/0094; H04L 1/08; H04L 5/0016; H04L 5/0023; H04L 5/0007; H04B 2001/6904; H04B 1/69; H04B 1/713; H10W 74/00; H10W 90/722; H10W 90/754; H10W 72/071; H04J 13/0074;

H04J 11/00; H04J 2011/0013; H04W 72/0473; H04W 72/23; H04W 72/0446; H04W 88/08; H04W 72/0453; H04W 24/00
See application file for complete search history.

(56) References Cited

U.S. PATENT DOCUMENTS

| | | | | |
|---|---|---|---|---|
| 11,296,769 B2 * | 4/2022 | Ryu | ...................... | H04B 7/0691 |
| 12,483,304 B2 * | 11/2025 | Yuan | ................... | H04B 7/0473 |

(Continued)

FOREIGN PATENT DOCUMENTS

| | | | | |
|---|---|---|---|---|
| WO | 2021/155818 | 8/2021 | | |
| WO | 2021/159399 | 8/2021 | | |
| WO | WO-2025207991 A1 * | 10/2025 | ............ | H04W 52/46 |

OTHER PUBLICATIONS

Extended European Search Report for co-pending EP Application No. 23825183.9, dated Oct. 1, 2024, 12 pages.

(Continued)

*Primary Examiner* — Phuongchau Ba Nguyen
(74) *Attorney, Agent, or Firm* — Perkins Coie LLP

(57)          ABSTRACT
This disclosure is directed to methods, systems, and devices related to wireless communication, and more specifically, to support high capability user equipment and to improve uplink A method of wireless communication, comprising receiving, by a wireless communication device, from a network device, a configuration of a sounding reference signal (SRS) resource with a plurality of ports or port groups; determining, by the wireless communication device, a parameter for an SRS port or an SRS port group of the SRS resource; and wherein the parameter comprises at least one of: one or more symbols, a comb offset, or a cyclic shift (CS) offset.

28 Claims, 12 Drawing Sheets

900 receiving, by a wireless communication device, from a network device, a configuration of a sounding reference signal (SRS) resource with a plurality of ports or port groups
902 determining, by the wireless communication device, a parameter for an SRS port or an SRS port group of the SRS resource
904

(56)          References Cited

U.S. PATENT DOCUMENTS

| | | | | |
|---|---|---|---|---|
| 2018/0054290 | A1* | 2/2018 | Park | H04W 72/21 |
| 2025/0317938 | A1* | 10/2025 | Haghighat | H04L 5/0026 |

OTHER PUBLICATIONS

ZTE "SRS enhancement targeting TDD CJT and 8 TX operation" 3GPP TSG RAN WG1 Meeting #109-e e-Meeting, May 9-20, 2022, R1-2203267, 6 pages.

CATT, "Discussion on SRS enhancement" 3GPP TSG RAN WG1 Meeting #11 0bis-e e-Meeting, Oct. 10-19, 2022, R1-2208949, 6 pages.

Futurewei "SRS enhancements for TDD CJT and 8TX operation" 3GPP TSG RAN WG1 Meeting #111 R1-2210848 Toulouse, France, November 14-18, R1-2210848, 32 pages.

LG Electronics "SRS enhancement targeting TDD CJT and 8 TX operation" 3GPP TSG RAN WG1 #111, R1-2211863, Toulouse, France, Nov. 14-18, 2022, 4 pages.

Huawei, et al. "SRS enhancement for TDD CJT and UL 8Tx operation in Rel-18" 3GPP TSG-RAN WG1 Meeting #110, R1-2205883, Toulouse, France, Aug. 22-26, 2022, 21 pages.

Futurewei "FL Summary #4 on SRS enhancements" 3GPP TSG RAN WG1 Meeting #110bis-e, R1- 2210711, eMeeting, Oct. 10-19, 2022, 103 pages.

Huawei, et al. "Evaluation on AI/ML for positioning accuracy enhancement" 3GPP TSG-RAN WG1 Meeting #111, R1-2210889, Toulouse, France, Nov. 14-18, 2022, 18 pages.

ZTE "SRS enhancement targeting TDD CJT and 8 TX operation" 3GPP TSG RAN WG1 #111, R1-2210939, Toulouse, France, Nov. 14-18, 2022, 15 pages.

Vivo "Discussion on SRS enhancement" 3GPP TSG RAN WG1 #111 R1-2210994, Toulouse, France, Nov. 14-18, 2022, 12 pages.

CMCC "Discussion on SRS enhancement targeting TDD CJT and 8 TX operation" 3GPP TSG RAN WG1 #111, R1-2211668, Toulouse, France, Nov. 14-18, 2022, 10 pages.

OPPO "SRS enhancement targeting TDD CJT and 8 TX operation" 3GPP TSG RAN WG1 #110, R1-2206267, Toulouse, France, Aug. 22-26, 2022, 6 pages.

Notice of Acceptance for co-pending South African Application No. 2023/11714, dated Apr. 3, 2025, 1 page.

International Search Report and Written Opinion for PCT/CN2022/072997, filed Jan. 18, 2023, Report dated Sep. 1, 2023, 7 pages.

Vivo "Remaining issues on SRS enhancement" 3GPP TSG RAN WG1 #107-e R1- 2110995, e-Meeting, Nov. 11-19, 2021, 22 pages.

Examination Report for Co-Pending MX Application No. MX/a/2023/015510, dated Mar. 3, 2026, 10 pages with unofficial English translation.

Office Action for co-pending KR Patent Application No. 10-2023-7045316, mailed on Mar. 17, 2026, 14 pages with unofficial English translation.

Vivo, "Further discussion on SRS enhancement," 3GPP TSG RAN WG1 #106bis-e, R1-2108956, e-Meeting, Oct. 11-19, 2021, 20 pages.

* cited by examiner

| FD | $K_{TC}=2$ | | $K_{TC}=4$ | | | |
| --- | --- | --- | --- | --- | --- | --- |
| | comb 0 | comb 1 | comb 0 | comb 1 | comb 2 | comb 3 |
| 0 | X | | X | | | |
| 1 | | X | | X | | |
| 2 | X | | | | X | |
| 3 | | X | | | | X |
| 4 | X | | X | | | |
| 5 | | X | | X | | |
| … | | | | | | |

FIG. 1

$n_{SRS}^{cs,max}=6$

| CD | CS set 0 | CS set 1 |
| --- | --- | --- |
| 0 | Port 0 | |
| 1 | | Port 0 |
| 2 | | |
| 3 | Port 1 | |
| 4 | | Port 1 |
| 5 | | |
| / | | |
| / | | |

$n_{SRS}^{cs,max}=8$

| CD | CS set 0 | CS set 1 |
| --- | --- | --- |
| 0 | Port 0 | |
| 1 | | Port 0 |
| 2 | | |
| 3 | | Port 1 |
| 4 | Port 1 | |
| 5 | | Port 2 |
| 6 | | |
| 7 | | Port 3 |

FIG. 2

| pattern | s0 | s1 | s2 | s3 | s4 | s5 | s6 | s7 |
|---------|----|----|----|----|----|----|----|----|
| 0       | X  |    |    |    |    |    |    |    |
| 1       |    |    | X  |    |    |    | X  |    |
| 2       |    | X  |    |    |    | X  |    |    |
| 3       |    |    |    | X  |    |    |    | X  |

FIG. 3

| pattern | s0 | s1 | s2 | s3 | s4 | s5 | s6 | s7 |
|---|---|---|---|---|---|---|---|---|
| | R=2 | | R=2 | | R=2 | | R=2 | |
| 0 | X | X | | | | | | |
| 1 | | | | | X | X | | |
| 2 | | | X | X | | | | |
| 3 | | | | | | | X | X |

FIG. 4

| pattern | | s0 | s1 | s2 | s3 | s4 | s5 | s6 | s7 |
|---|---|---|---|---|---|---|---|---|---|
| | | g0 | g1 | g0 | g1 | g0 | g1 | g0 | g1 |
| 0 | | X | X | | | | | | |
| 1 | | | | | | X | X | | |
| 2 | | | | X | X | | | | |
| 3 | | | | | | | | X | X |

FIG. 5

| pattern | s0 g0 | s1 g0 R=2 | s2 g1 | s3 g1 R=2 | s4 g0 | s5 g0 R=2 | s6 g1 | s7 g1 R=2 |
|---|---|---|---|---|---|---|---|---|
| 0 | X | X | | | | | | |
| 1 | | | | | X | X | | |
| 2 | | | X | X | | | | |
| 3 | | | | | | | X | X |

FIG. 6

| pattern | s0 | s1 | s2 | s3 | s4 | s5 | s6 | s7 |
|---|---|---|---|---|---|---|---|---|
| | g0 | g0 | g1 | g1 | g0 | g0 | g1 | g1 |
| | R=2 | | R=2 | | R=2 | | R=2 | |
| 0 | X | X | X | X | | | | |
| 1 | | | | | | | | |
| 2 | | | | | X | X | X | X |
| 3 | | | | | | | | |

FIG. 7

| pattern | s0 | s1 | s2 | s3 | s4 | s5 | s6 | s7 |
|---|---|---|---|---|---|---|---|---|
| | g0 | g1 | g0 | g1 | g0 | g1 | g0 | g1 |
| | | | R=2 | | | | R=2 | |
| 0 | X | X | X | X | | | | |
| 1 | | | | | | | | |
| 2 | | | | | X | X | X | X |
| 3 | | | | | | | | |

FIG. 8 receiving, by a wireless communication device, from a network device, a configuration of a sounding reference signal (SRS) resource with a plurality of ports or port groups
902 determining, by the wireless communication device, a parameter for an SRS port or an SRS port group of the SRS resource
904

900 transmitting, to a wireless communication device, from a network device, a configuration of a sounding reference signal (SRS) resource with a plurality of ports or port groups
1002 determining, by the wireless communication device, a parameter for an SRS port or an SRS port group of the SRS resource
1004

1000

SYSTEMS AND METHODS FOR SOUNDING REFERENCE SIGNAL ENHANCEMENT

CROSS-REFERENCE TO RELATED APPLICATION

This application is a continuation and claims priority to International Application No. PCT/CN2023/072997, filed on Jan. 18, 2023, the disclosure of which is hereby incorporated by reference herein in its entirety.

TECHNICAL FIELD

This disclosure is directed generally to wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices, as well as support an increasingly mobile society.

SUMMARY

Various techniques are disclosed that can be implemented by embodiments in mobile communication technology, including 5th Generation (5G), new radio (NR), 4th Generation (4G), and long-term evolution (LTE) communication systems.

In one example aspect, a wireless communication method is disclosed. The method includes receiving, by a wireless communication device, from a network device, a configuration of a sounding reference signal (SRS) resource with a plurality of ports or port groups; determining, by the wireless communication device, a parameter for an SRS port or an SRS port group of the SRS resource; and wherein the parameter comprises at least one of: one or more symbols, a comb offset, or a cyclic shift (CS) offset.

In another example aspect, another wireless communication method is disclosed. The method includes transmitting, to a wireless communication device, from a network device, a configuration of a sounding reference signal (SRS) resource with a plurality of ports or port groups; determining, by the wireless communication device, a parameter for an SRS port or an SRS port group of the SRS resource; and wherein the parameter comprises at least one of: one or more symbols, a comb offset, or a cyclic shift (CS) offset.

In yet another exemplary aspect, the above-described methods are embodied in the form of a computer-readable medium that stores processor-executable code for implementing the method.

In yet another exemplary embodiment, a device that is configured or operable to perform the above-described methods is disclosed. The device comprises a processor configured to implement the method.

The above and other aspects and their implementations are described in greater detail in the drawings, the descriptions, and the claims.

BRIEF DESCRIPTION OF THE DRAWINGS

FIG. 1 illustrates an example for comb offset and $K_{TC}$ frequency domain.

FIG. 2 illustrates an example for cyclic shift offset and $$n_{SRS}^{cs,max}$$

code domain

FIG. 3 illustrates an example for a hopping pattern with repetition.

FIG. 4 illustrates another example for a hopping pattern with repetition.

FIG. 5 illustrates another example for a hopping pattern with repetition.

FIG. 6 illustrates another example for a hopping pattern with repetition.

FIG. 7 illustrates another example for a hopping pattern with repetition.

Figure 8:
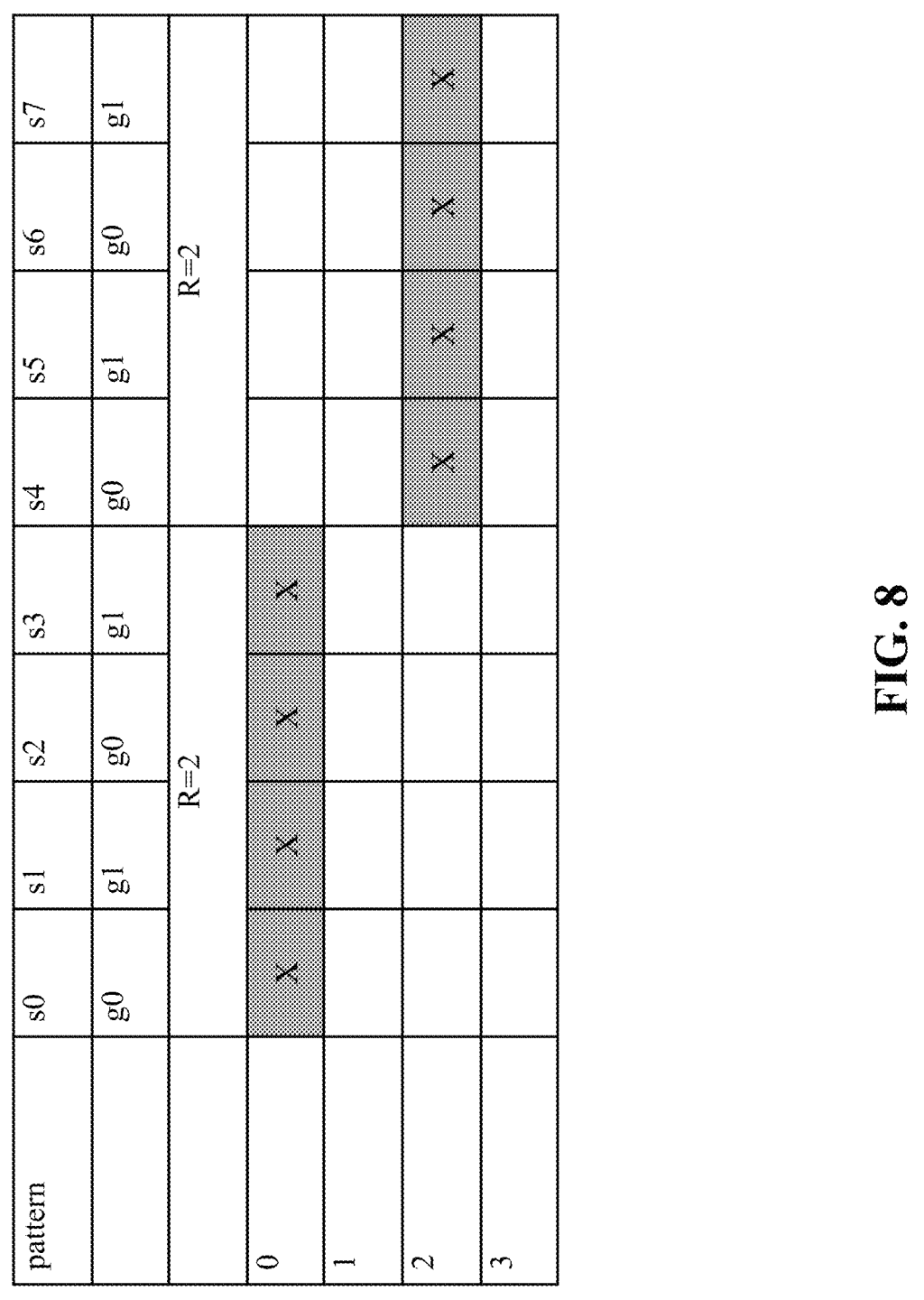

FIG. 8 illustrates another example for a hopping pattern with repetition.

Figure 9:
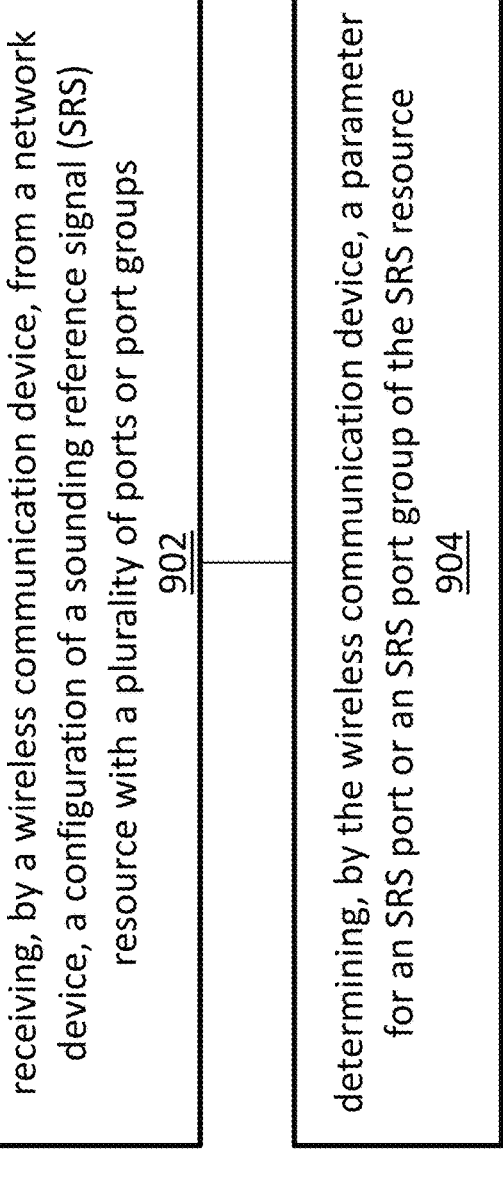

FIG. 9 is a flowchart illustrating an example method.

Figure 10:
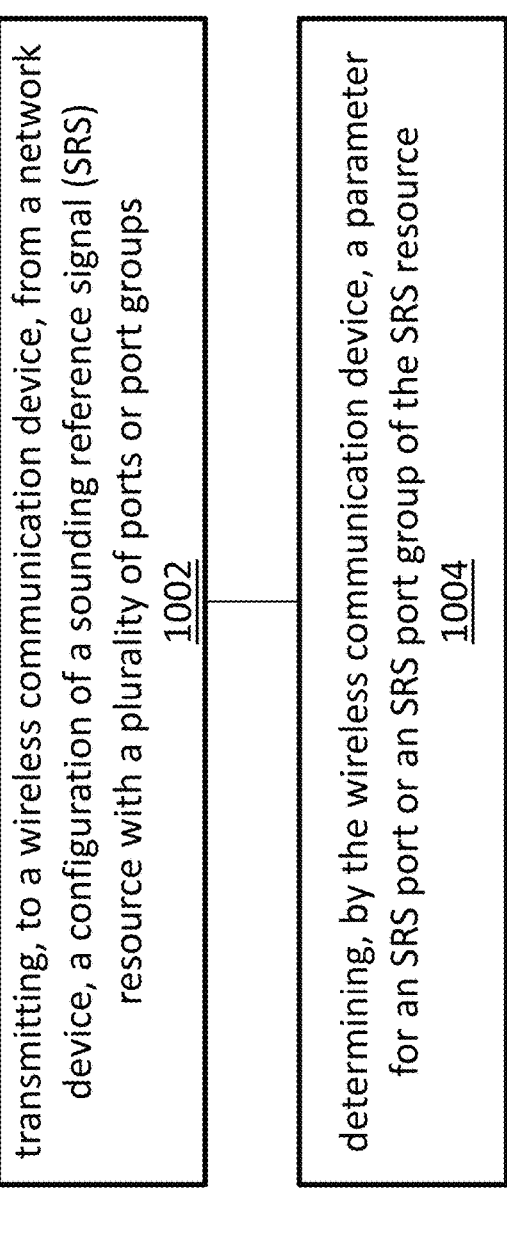

FIG. 10 is a flowchart illustrating an example method.

Figure 11:
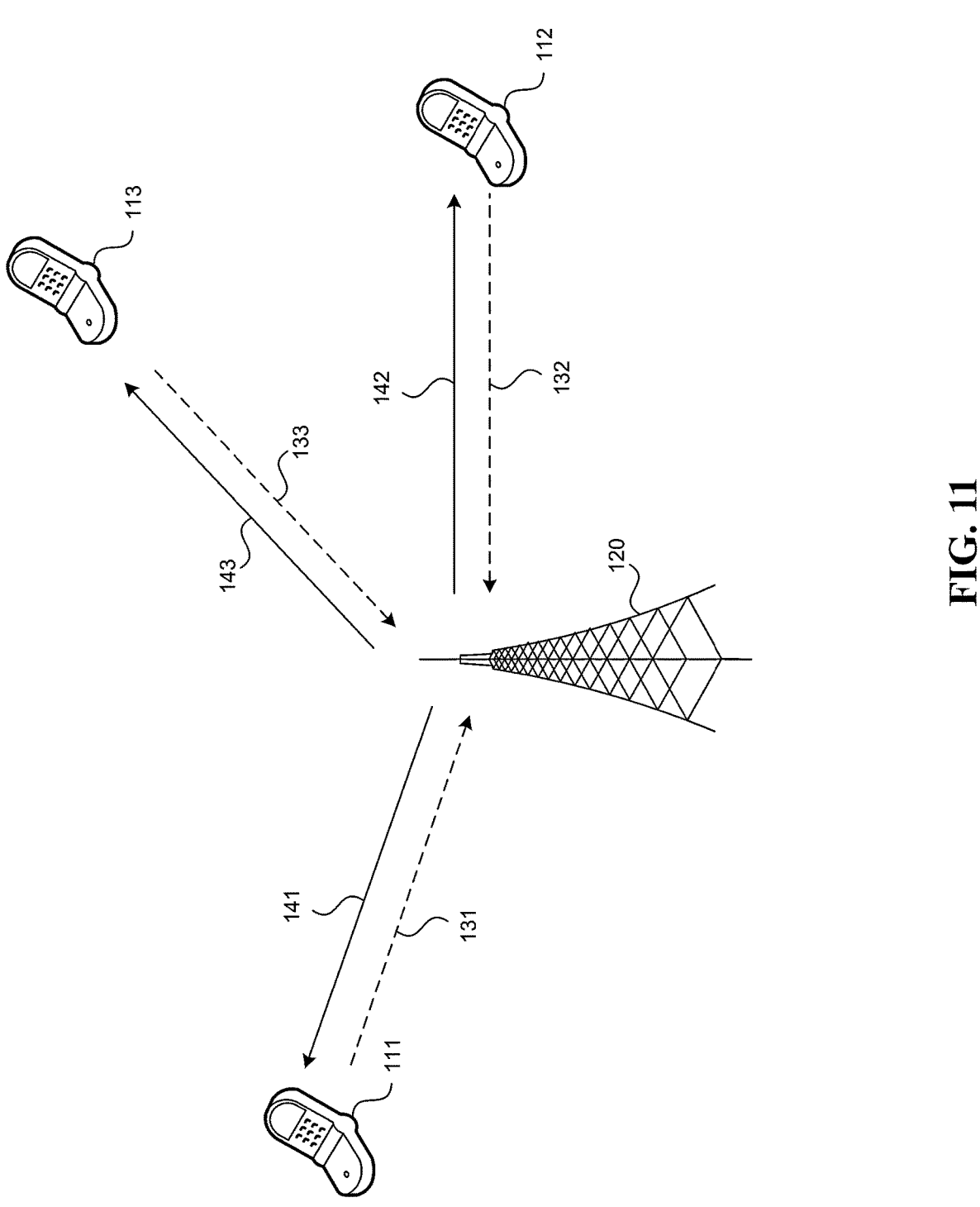

FIG. 11 is a block diagram example of a wireless communication system.

Figure 12:
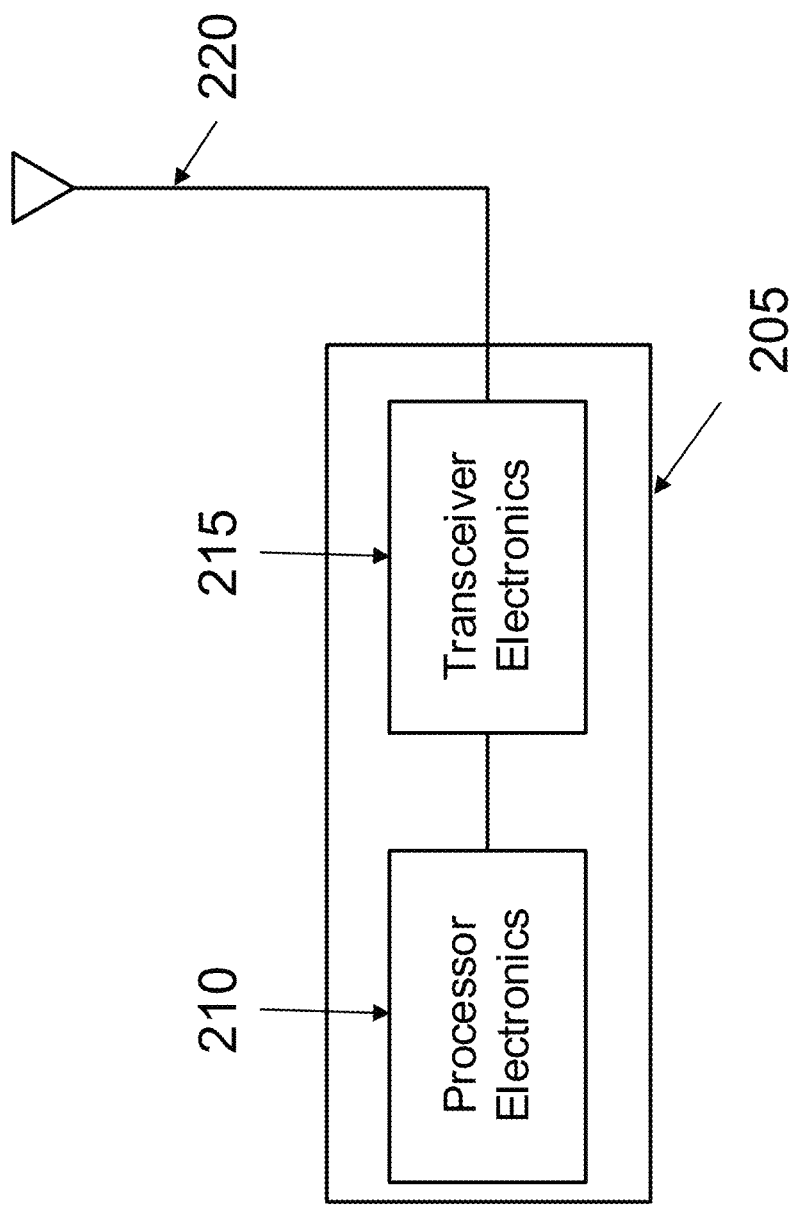

FIG. 12 is a flowchart of an example method of wireless communication.

DETAILED DESCRIPTION

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The new radio (NR) technology of fifth generation (5G) mobile communication systems is continuously improved to provide higher quality wireless communication. One key feature is to support high capability user equipment (UE), such as customer premise equipment or fixed wireless access (CPE/FWA), to improve uplink (UL) quality. Up to eight (8) transmits (Tx) (antenna ports) for UL transmission is one of such features because legacy UE can support up to 4 Tx.

A UE can be configured with an (Sounding Reference Signal) SRS resource with 8 ports for UL 8 Tx (codebook based) transmission, or for antenna switching.

For an SRS resource with 8 ports, it is not clear on how to determine transmission scheme (or transmission parameters, such as transmission resource in frequency domain, time domain, and/or code domain) for each port, especially when more than one symbol is configured for the 8 ports.

Embodiment 1

Solution 1: A UE is configured by a network with an SRS resource set, and an SRS resource with X number of e.g., 8, ports is included in the SRS resource set.

When X=8 ports are grouped into G groups, ports in a group have a same value for at least one of the following parameters:

Time domain parameter, e.g., slot and/or symbol, or Comb offset.

The ports with port indexes ($p_i$) are in a group with index of $g_i$, according to one of the following rules, where $p_i \in \{0, 1, \ldots 7\}$, $g_i \in \{0, 1, \ldots G\}$ and G is the number of groups, e.g., 2, or 4 for 8 ports:

$$g_i = \lfloor p_i / G \rfloor,$$

$$g_i = p_i \bmod G,$$

For G=2, $p_i=\{0, 1, 4, 5\}$ are in one group, $p_i=\{2, 3, 6, 7\}$ are in the other group, e.g., $g_i=0$ and 1 respectively, For G=2, $p_i=\{0, 1, 2, 3\}$ are in one group, $p_i=\{4, 5, 6, 7\}$ are in the other group, e.g., $g_i=0$ and 1 respectively, [36]1, 2, and 3 respectively, or For G=4, $p_i=\{0, 1\}$, $p_i=\{2, 3\}$, $p_i=\{4, 5\}$, $p_i=\{6, 7\}$ are in four groups, e.g., $g_i=0$ 1, 2, and 3 respectively.

For example, ports in a group have a same value for a time domain parameter, e.g., OFDM symbol, assuming there are 8 ports and 2 symbols, and 8 ports are split into 2 groups, as shown in Table 1.

TABLE 1

| Port index | $1^{st}$ symbol | $2^{nd}$ symbol |
|---|---|---|
| Scheme 1 | 0, 1, 2, 3 | 4, 5, 6, 7 |
| Scheme 2 | 0, 1, 4, 5 | 2, 3, 6, 7 |

In another example, assuming there are 8 ports and 4 symbols, and 8 ports are split into 4 groups, as shown in Table 2.

TABLE 2

| Port index | $1^{st}$ symbol | $2^{nd}$ symbol | $3^{rd}$ symbol | $4^{th}$ symbol |
|---|---|---|---|---|
| Scheme 1 | 0, 1 | 2, 3 | 4, 5, | 6, 7 |
| Scheme 2 | 0, 4 | 1, 5 | 2, 6 | 3, 7 |

In yet another example, ports in a group have same value for a comb offset, assuming there are 8 ports and 2 comb offsets, and 8 ports are split into 2 groups, as shown in Table 3.

TABLE 3

| Port index | $1^{st}$ comb | $2^{nd}$ comb |
|---|---|---|
| Scheme 1 | 0, 1, 2, 3 | 4, 5, 6, 7 |
| Scheme 2 | 0, 1, 4, 5 | 2, 3, 6, 7 |

In yet another example, assuming there are 8 ports and 4 comb offsets, and 8 ports are split into 4 groups, as shown in Table 4.

TABLE 4

| Port index | $1^{st}$ comb | $2^{nd}$ comb | $3^{rd}$ comb | $4^{th}$ comb |
|---|---|---|---|---|
| Scheme 1 | 0, 1 | 2, 3 | 4, 5, | 6, 7 |
| Scheme 2 | 0, 4 | 1, 5 | 2, 6 | 3, 7 |

Solution 2:When SRS repetition in time domain, e.g., repetition factor R>1, mapping of port groups and symbols considering repetition according to one of the following rules:

Option A: First repetition, second port groups.

R continuous symbols correspond to a port group,

R continuous symbols are within one slot, and

Different port groups are mapped to symbols in one slot or in different slots.

Option B: First port groups, second repetition.

G port groups correspond to a repetition with G continuous symbols,

G continuous symbols are within one slot, and

Different repetitions are mapped to symbols in one slot or in different slots.

For the repetition factor R=2, there are 2 repetitions. One repetition corresponds to a number of non-repeated symbols for all ports.

Table 5 shows an example of 8 ports and 4 symbols (R=2) with 2 port groups:

TABLE 5

| port | $1^{st}$ symb | $2^{nd}$ symb | $3^{rd}$ symb | $4^{th}$ symb |
|---|---|---|---|---|
| Option A with Scheme 1 | 0, 1, 2, 3 | 0, 1, 2, 3 | 4, 5, 6, 7 | 4, 5, 6, 7 |
| Option B with Scheme 1 | 0, 1, 2, 3 | 4, 5, 6, 7 | 0, 1, 2, 3 | 4, 5, 6, 7 |

Option C: first, a part of repetition for a part of port groups, second, a next part of repetition for a next part of port groups, . . . and so on.

A part of repetition for a part of port groups are within one slot, and different parts of repetitions are mapped to symbols in one slot or in different slots.

Table 5-1 shows an example of 8 ports and 8 symbols (R=4) with 2 port groups:

TABLE 5-1

| port | $1^{st}$ symb | $2^{nd}$ symb | $3^{rd}$ symb | $4^{th}$ symb | $5^{th}$ symb | $6^{th}$ symb | $7^{th}$ symb | $8^{th}$ symb |
|---|---|---|---|---|---|---|---|---|
| Option C with Scheme 1 | 0, 1, 2, 3 | 0, 1, 2, 3 | 4, 5, 6, 7 | 4, 5, 6, 7 | 0, 1, 2, 3 | 0, 1, 2, 3 | 4, 5, 6, 7 | 4, 5, 6, 7 |
| Option A with Scheme 1 | 0, 1, 2, 3 | 0, 1, 2, 3 | 0, 1, 2, 3 | 0, 1, 2, 3 | 4, 5, 6, 7 | 4, 5, 6, 7 | 4, 5, 6, 7 | 4, 5, 6, 7 |
| Option B with Scheme 1 | 0, 1, 2, 3 | 4, 5, 6, 7 | 0, 1, 2, 3 | 4, 5, 6, 7 | 0, 1, 2, 3 | 4, 5, 6, 7 | 0, 1, 2, 3 | 4, 5, 6, 7 |

Embodiment 2: CS (Cyclic Shift) for 8 SRS Ports on m (>=1) Symbols

One example embodiment is shown below, more details can be found in 3GPP TS 38.213.

The cyclic shift $\alpha_i$ for antenna port $p_i$ is given as $$\alpha_i = 2\pi \frac{n_{SRS}^{cs,i}}{n_{SRS}^{cs,max}}$$

$$n_{SRS}^{cs,i} =$$

$$\begin{cases} \left( n_{SRS}^{cs} + \dfrac{n_{SRS}^{cs,max} \left\lfloor (p_i - 1000)/2 \right\rfloor}{N_{ap}^{SRS}/2} \right) \bmod n_{SRS}^{cs,max} & \text{if } N_{ap}^{SRS} = 4 \text{ and } n_{SRS}^{cs,max} = 6 \\ \left( n_{SRS}^{cs} + \dfrac{n_{SRS}^{cs,max}(p_i - 1000)}{N_{ap}^{SRS}} \right) \bmod n_{SRS}^{cs,max} & \text{otherwise} \end{cases},$$

where $$n_{SRS}^{cs} \in \{0, 1, \ldots, N_{SRS}^{cs,max} - 1\}$$

is contained in the higher layer parameter transmissionComb. The maximum number of cyclic shifts $$n_{SRS}^{cs,max}$$

are given by Table 6.4.1.4.2-1.

$$l' \in \{0, 1, \ldots, N_{symb}^{SRS} - 1\}$$

Solution 1: Port groups e.g., in different symbols
Option 1: Share same CS set
E.g., $$n_{SRS}^{cs,max} = 8,$$

CS={0, 2, 4, 6} for ports in first group respectively, CS={0, 2, 4, 6} for ports in second group respectively.

E.g., $$n_{SRS}^{cs,max} = 4,$$

CS={0, 1, 2, 3} for ports in first group respectively, CS={0, 1, 2, 3} for ports in second group respectively If port group has natural ordered ports, e.g., scheme 1 in embodiment 1, CS index for ports can be determined directly by using the following formula. If port group does not have natural ordered ports, e.g., scheme 2 in embodiment 1, it may need to transform at first. E.g., natural ordered port {0, 1, 2, 3} mapping to port {0, 1, 4, 5}, natural ordered port {4,5,6,7} mapping to port {2,3,6,7}. Use the following formula to determine a CS index for a natural ordered port index, then a mapping port actually uses this CS index. The natural ordered port index is just for calculating CS index.

Formula can be:

$$n_{SRS}^{CS,i} = \left( n_{SRS}^{CS} + \frac{n_{SRS}^{CS,max} \left\lfloor (p_i - 1000) \bmod \left( N_{ap}^{SRS}/2 \right) \right\rfloor}{N_{ap}^{SRS}/2} \right) \bmod n_{SRS}^{CS,max},$$

if $N_{ap}^{SRS} = 8$ and $N_{symb}^{SRS}/R$

>1.

The general formula is:

if $N_{ap}^{SRS} = 8$ and $N_{symb}^{SRS}/R > 1$, $$n_{SRS}^{CS,i} = \left( n_{SRS}^{CS} + \frac{n_{SRS}^{CS,max} \left\lfloor (p_i - 1000) \bmod \left( N_{ap}^{SRS}/N_{pg}^{SRS} \right) \right\rfloor}{N_{ap}^{SRS}/N_{pg}^{SRS}} \right) \bmod n_{SRS}^{CS,max},$$

where $N_{pg}^{SRS}$ is number of port groups which is $$N_{symb}^{SRS}/R,$$

and can be 2 or 4.

If the formula considers actual port index, the formula can be:

if $$N_{ap}^{SRS} = 8 \text{ and } N_{symb}^{SRS}/R > 1,$$

and pi in port groups are natural ordered, $$n_{SRS}^{CS,i} = \left( n_{SRS}^{CS} + \frac{n_{SRS}^{CS,max} \left\lfloor (p_i - 1000) \bmod \left( N_{ap}^{SRS}/N_{pg}^{SRS} \right) \right\rfloor}{N_{ap}^{SRS}/N_{pg}^{SRS}} \right) \bmod n_{SRS}^{CS,max},$$

if $$N_{ap}^{SRS} \text{ and } N_{symb}^{SRS}/R > 1,$$

and pi in port groups are not natural ordered, and $$n_{SRS}^{CS,i} = \left( n_{SRS}^{CS} + \frac{n_{SRS}^{CS,max} \left\lfloor (p_1 - 1000) \bmod \left( N_{ap}^{SRS}/2N_{pg}^{SRS} \right) + N_{ap}^{SRS}/2N_{pg}^{SRS} \right\rfloor}{N_{ap}^{SRS}/N_{pg}^{SRS}} \right)$$
$$\bmod \, n_{SRS}^{CS,max}, \text{ if } (p_1 - 1000) >= \left( N_{ap}^{SRS}/N_{pg}^{SRS} \right)$$

$$N_{pg}^{SRS} =$$

$$2^{n_{SRS}^{CS,i}} = \left( n_{SRS}^{CS} + \frac{n_{SRS}^{CS,max} \left\lfloor (p_1 - 1000) \bmod \left( N_{ap}^{SRS}/2N_{pg}^{SRS} \right) \right\rfloor}{N_{ap}^{SRS}/N_{pg}^{SRS}} \right) \bmod n_{SRS}^{CS,max},$$

if $(p_1 - 1000) < \left( N_{ap}^{SRS}/N_{pg}^{SRS} \right)$

Option 2: Different CS sets
E.g., $$n_{SRS}^{cs,max} = 8,$$

first port group: CS_$p_i$={0, 2, 4, 6}, second port group: CS_$p_i$={1, 3,5,7}

The general formula is:

$$n_{SRS}^{CS,i} = \left( n_{SRS}^{CS} + \frac{n_{SRS}^{CS,max} \left\lfloor (p_i - 1000) \bmod \left( N_{ap}^{SRS} / N_{pg}^{SRS} \right) \right\rfloor}{N_{ap}^{SRS} / N_{pg}^{SRS}} + n_{pg}^i \right) \bmod n_{SRS}^{CS,max},$$

where $$n_{pg}^i$$

is port group index, e.g., 0, 1 in 2-group, 0, 1, 2, 3 in 4-group. Method to determine this index may depend on specific SRS port order scheme. The port group index is gi in embodiment 1.

Furthermore, consider CS hopping, a time-domain parameter can be added to the formula, e.g., symbol index.

For one or more port groups in one symbol or repeated in more than one symbol.

All ports in the one or more port groups share a comb.

CS is determined for all ports in the one or more port groups with a gap of $$n_{SRS}^{cs,max} / (\text{number of ports in the one or more groups})$$

and with a starting CS of $$n_{SRS}^{CS}.$$

Embodiment 3: Frequency-Domain Starting Position and CS

One example embodiment is shown below, more details can be found in 3GPP TS 38.213.
The frequency-domain starting position $$k_0^{(p_i)}$$

is defined by $$k_0^{(p_i)} = \bar{k}_0^{(p_i)} + n_{offset}^{FH} + n_{offset}^{RPFS}$$

where $$\bar{k}_0^{(p_i)} = n_{shift} N_{sc}^{RB} + \left( k_{TC}^{(p_i)} + k_{offset}^{i'} \right) \bmod K_{TC}$$

$$k_{TC}^{(p_i)} =$$
$$\begin{cases} \left( \bar{k}_{TC} + K_{TC}/2 \right) \bmod K_{TC} & \text{if } N_{ap}^{SRS} = 4,\ p_i \in \{1001, 1003\},\ \text{and } n_{SRS}^{cs,max} = 6 \\ \left( \bar{k}_{TC} + K_{TC}/2 \right) \bmod K_{TC} & \text{if } N_{ap}^{SRS} = 4,\ p_i \in \{1001, 1003\},\ \text{and } n_{SRS}^{cs} \in \left\{ n_{SRS}^{cs,max}/2, \ldots, n_{SR}^{cs,max} \right. \\ \bar{k}_{TC} & \text{otherwise} \end{cases}$$

$$n_{offset}^{FH} = \sum_{b=0}^{B_{SRS}} m_{SRS,b} N_{sc}^{RB} n_b$$

$$n_{offset}^{RPFS} = N_{sc}^{RB} m_{SRS,B_{SRS}} ((k_F + k_{hop}) \bmod P_F)/P_F$$

and $k_F \in \{0, 1, \ldots, P_F - 1\}$ is given by the higher-layer parameter StartRBIndex if configured, otherwise $k_F = 0$;

$k_{hop}$ is given by Table 6.4.1.4.3-3 with $$\bar{k}_{hop} = \left\lfloor \frac{n_{SRS}}{\prod_{b'=b_{hop}}^{B_{SRS}} N_{b'}} \right\rfloor \bmod P_F$$

$$N_{b_{hop}} = 1$$

if the higher-layer parameter EnableStartRBHopping is configured, otherwise $k_{hop} = 0$.

TABLE 6.4.1.4.2-1

Maximum number of cyclic shifts $n_{SRS}^{cs,max}$ as a function of $K_{TC}$.

| $K_{TC}$ | $n_{SRS}^{cs,max}$ |
|---|---|
| 2 | 8 |
| 4 | 12 |
| 8 | 6 |

Ports can be differentiated by FDM (comb related) and/or CDM (CS related).

Table 6, also shown as FIG. 1, is an example for comb offset and $K_{TC}$. FD: frequency domain The boxes marked X indicate frequency domain resource for all or part of ports of an SRS.

TABLE 6

| FD | $K_{TC} = 2$ | | $K_{TC} = 4$ | | | |
|---|---|---|---|---|---|---|
| | comb 0 | comb 1 | comb 0 | comb 1 | comb 2 | comb 3 |
| 0 | X | | X | | | |
| 1 | | X | | X | | |
| 2 | X | | | | X | |
| 3 | | X | | | | X |
| 4 | X | | X | | | |
| 5 | | X | | X | | |
| . . . | | | | | | |

Table 7, also shown as FIG. 2, is an example for CS offset and $$n_{SRS}^{cs,max}.$$

CD: code domain

The boxes with port information indicate code domain resource for one port of an SRS.

TABLE 7

| | $n_{SRS}^{cs,max} = 6$ | | | $n_{SRS}^{cs,max} = 8$ | |
|---|---|---|---|---|---|
| CD | CS set 0 | CS set 1 | CD | CS set 0 | CS set 1 |
| 0 | Port 0 | | 0 | Port 0 | |
| 1 | | Port 0 | 1 | | Port 0 |
| 2 | | | 2 | | |
| 3 | Port 1 | | 3 | | Port 1 |
| 4 | | Port 1 | 4 | Port 1 | |
| 5 | | | 5 | | Port 2 |
| / | | | 6 | | |
| / | | | 7 | | Port 3 |

Solution 2:

8 ports in 1 symbol:

CS Only: 8 CS in $$n_{SRS}^{CS,max} = 8, 12$$

Comb Only: 8 Comb offsets for $K_{TC}=8$

CS+Comb:

$K_{TC}=2$, using 4 CS $K_{TC}=4$, using 2 CS $$n_{SRS}^{CS,max}$$

can be 8, 12, 6

The formula is:

$$k_{TC}^{(p_i)} = \left( \overline{k}_{TC} + \frac{K_{TC} n_{cgi}}{N_{cg}^{SRS}} \right) \bmod K_{TC},$$

where $$N_{cg}^{SRS}$$

is number of comb groups, and $n_{cgi}$ is index of comb group for port i.

$$N_{cg}^{SRS}$$

is configured for a SRS by RRC signaling, e.g., 1, 2, 4 or 8, or is determined as a predefined value, e.g., 1, 2, 4 or 8, or is determined as a function of number of port groups, e.g., 8/(number of port groups), or a function of number of symbols, e.g., 8/(number of symbols), or 8/(number of symbols/factors of repetition).

$$N_{cg}^{SRS}$$

is determined for a symbol or a port group, or for all symbols or all port groups of a SRS.

$n_{cgi}$ is determined according to a port index, e.g., via a mapping between port index and comb group index, or a function of port index.

For example, $$N_{cg}^{SRS}$$

is determined as 2, $n_{cgi}$ is determined as 0 for port 0-3 (or 0, 1, 4, 5), and 1 for port 4-7 (or 2, 3, 6, 7).

In another example, $$N_{cg}^{SRS}$$

is determined as 4, $n_{cgi}$ is determined as 0 for port 0-1, 1 for port 2-3, 2 for port 4-5, and 3 for port 6-7.

$n_{cgi}$ may be related to symbol index, or symbol order, e.g., 0 for first symbol, 1 for second symbol, or 1/0 for first/second symbol.

8 ports in 2 symbols (2 port groups), assuming R=1, CS and/or Comb within one group (4-port):

2 port groups can share same comb, or have different combs; same or different combs can be independent with the same or different CS between 2 port groups.

TDM+CS Only: 4 CS in $$n_{SRS}^{CS,max} = 8, 12, 6$$

TDM+Comb Only: $K_{TC}=4$ or 8(2 different sets)

TDM+CS+Comb:

$K_{TC}=2$, using 2/4(2 different sets) CS

Formula of comb and/or CS for each port group can reuse current 4 ports scheme. Port groups can have same or different comb and/or same or different CS.

Ports in each port group are re-ordered as port 0, 1, 2, 3, when reusing legacy 4 ports scheme.

In one example, for 8 ports with N_symbol/R=2, port 0, 1, 2, or 3 (or port 0, 1, 4, or 5) in port group 0 are mapped to port 0, 1, 2, or 3 in legacy scheme respectively; port 4, 5, 6, or 7 (or port 2, 3, 6, or 7) in port group 1 are mapped to port 0, 1, 2, or 3 in legacy scheme respectively. So, port 0, 1, 2, or 3 (or port 0, 1, 4, or 5) in port group 0 and port 4, 5, 6, or 7 (or port 2, 3, 6, or 7) in port group 1 may have same CS or same comb respectively, in different symbols.

In another example, the ports in first port groups and the corresponding ports in second port groups may have different CS, in different symbols. The different CS can be determined by different starting or offset CS configured by network, e.g., each corresponding to a port group. Or the different CS can be determined by a predefined CS offset, e.g., half of CS gap between ports within a group, or 1/(number of port groups) of CS gap between ports within a group. Or the different CS can be determined by an CS offset determined by a time domain parameter, e.g., symbol index, or slot index, etc.

In yet another example, the ports in first port groups and the corresponding ports in second port groups may have different comb, in different symbols. The different comb can be determined by different starting or offset comb configured by network, e.g., each corresponding to a port group. Or the different comb can be determined by a predefined comb offset, e.g., half of comb span, or 1/(number of port groups) of comb span. Or the different comb can be determined by a comb offset determined by a time domain parameter, e.g., symbol index, or slot index, etc.

8 ports in 4 symbols (4 port groups), assuming R=1, CS and/or Comb within one group (2-port):

4 port groups share same comb or have different combs; same or different combs can be independent with same or different CS between 4 port groups.

TDM+CS Only: 2 CS in $$n_{SRS}^{CS,max} = 8, 12, 6$$

TDM+Comb Only: $K_{TC}$=2 or 8(4 different sets)

TDM+CS+Comb:

$K_{TC}$=2, using 2/4(2 different sets) CS

Formula of comb and/or CS for each port group can reuse current 2 ports scheme. Port groups can have same or different comb and/or same or different CS.

Ports in each port group are re-ordered as port 0, 1, when reusing legacy 2 ports scheme.

In one example, for 8 ports with N_symbol/R=4, port {0, 4}, {1, 5}, {2, 6} and {3, 7} (or port {0, 1}, {2, 3}, {4, 5} and {6, 7}) in 4 port groups, are mapped to port 0, 1 in legacy scheme respectively. So, port {0, 4}, {1, 5}, {2, 6} and {3, 7} (or port {0, 1}, {2, 3}, {4, 5} and {6, 7}) in 4 port groups may have same CS or same comb respectively, in different symbols.

In another example, the ports in one port group and the corresponding ports in another port group may have different CS, in different symbols. The different CS can be determined by different starting or offset CS configured by network, e.g., each corresponding to a port group. Or the different CS can be determined by a predefined CS offset, e.g., half of CS gap between ports within a group, or 1/(number of port groups) of CS gap between ports within a group. Or the different CS can be determined by an CS offset determined by a time domain parameter, e.g., symbol index, or slot index, etc.

In yet another example, the ports in one port group and the corresponding ports in another port group may have different comb, in different symbols. The different comb can be determined by different starting or offset comb configured by network, e.g., each corresponding to a port group. Or the different comb can be determined by a predefined comb offset, e.g., half of comb span, or 1/(number of port groups) of comb span. Or the different comb can be determined by a comb offset determined by a time domain parameter, e.g., symbol index, or slot index, etc.

Additionally, a new design for 8 ports in m symbols instead of reusing legacy 4 ports and 2 ports schemes could occur.

CS and comb pattern can be configured/indicated from a predefined pattern set, or implicitly determined based on CS parameters, e.g., # of ports in one SRS resource, # of ports in a symbol, $$n_{SRS}^{CS}, \text{ or } n_{SRS}^{CS,max}.$$

Furthermore, considering CS/comb hopping, a time-domain parameter can be added to the formula, e.g., symbol index.

Embodiment 4: Frequency Hopping for SRS

One example embodiment as: for the case of an SRS resource configured as aperiodic by the higher-layer parameter resourceType, it is given by $n_{SRS}=\lfloor l'/R \rfloor$ within the slot in which the $$N_{symb}^{SRS}$$

symbol SRS resource is transmitted. The quantity $$R \le N_{symb}^{SRS}$$

is the repetition factor given by the field repetitionFactor if configured, otherwise $$R = N_{symb}^{SRS}.$$

Solution: SRS port groups in different symbols share a same frequency hopping pattern. The counter of SRS, i.e., nSRS, can be increased by 1 every $$R * N_{pg}^{SRS}$$

symbols, where $$N_{pg}^{SRS}$$

is number of port groups. E.g., $$n_{SRS} = \lfloor l'/(R * N_{pg}^{SRS}) \rfloor,$$

where l' is the symbol index of SRS transmission in a slot.

Alternatively, the counter of SRS, i.e., nSRS, can be increased by 1 every R symbol, $n_{SRS}=\lfloor l'/R \rfloor$ and l' can be counted per port group.

In the case of repetition with repetition of R, a frequency hopping pattern, such as a frequency domain granularity position, can be kept same for R symbols for a port group. For another port group, the hopping pattern can be different or same.

For an example, Table 8, also shown as FIG. 3, shows a hopping pattern is 0, 2, 1, 3, when R=1, "s" means symbol.

TABLE 8

| pattern | s0 | s1 | s2 | s3 | s4 | s5 | s6 | s7 |
|---|---|---|---|---|---|---|---|---|
| 0 | X | | | | X | | | |
| 1 | | | X | | | | X | |
| 2 | | X | | | | X | | |
| 3 | | | | X | | | | X |

In another example, Table 9, also shown as FIG. 4, shows a hopping pattern is 0, 2, 1, 3, when R=2.

TABLE 9

| pattern | s0 R = 2 | s1 | s2 R = 2 | s3 | s4 R = 2 | s5 | s6 R = 2 | s7 |
|---|---|---|---|---|---|---|---|---|
| 0 | X | X | | | | | | |
| 1 | | | | | X | X | | |

TABLE 9-continued

| pattern | s0 R = 2 | s1 | s2 R = 2 | s3 | s4 R = 2 | s5 | s6 R = 2 | s7 |
|---|---|---|---|---|---|---|---|---|
| 2 | | | X | X | | | | |
| 3 | | | | | | | X | X |

In yet another example, Table 10, also shown as FIG. 5, shows a hopping pattern is 0, 2, 1, 3, when R=1, 2 TDMed port groups (g0 and g1).

TABLE 10

| pattern | s0 g0 | s1 g1 | s2 g0 | s3 g1 | s4 g0 | s5 g1 | s6 g0 | s7 g1 |
|---|---|---|---|---|---|---|---|---|
| 0 | X | X | | | | | | |
| 1 | | | | | X | X | | |
| 2 | | | X | X | | | | |
| 3 | | | | | | | X | X |

In yet another example, Table 11, also shown as FIG. 6, shows a hopping pattern is 0, 2, 1, 3, R=2, 2 TDMed port groups (g0 and g1) having different frequency hopping positions.

TABLE 11

| pattern | s0 g0 R = 2 | s1 g0 | s2 g1 R = 2 | s3 g1 | s4 g0 R = 2 | s5 g0 | s6 g1 R = 2 | s7 g1 |
|---|---|---|---|---|---|---|---|---|
| 0 | X | X | | | | | | |
| 1 | | | | | X | X | | |
| 2 | | | X | X | | | | |
| 3 | | | | | | | X | X |

In yet another example, Table 12, also shown as FIG. 7, shows a hopping pattern is 0, 2, 1, 3, R=2, 2 TDMed port groups (g0 and g1) having same frequency hopping positions. Time domain follows the order of first repetition, second port group.

TABLE 12

| pattern | s0 g0 R = 2 | s1 g0 | s2 g1 R = 2 | s3 g1 | s4 g0 R = 2 | s5 g0 | s6 g1 R = 2 | s7 g1 |
|---|---|---|---|---|---|---|---|---|
| 0 | X | X | X | X | | | | |
| 1 | | | | | | | | |
| 2 | | | | | X | X | X | X |
| 3 | | | | | | | | |

In yet another example, Table 13, also shown as FIG. 8, shows a hopping pattern is 0, 2, 1, 3, R=2, 2 TDMed port groups (g0 and g1), Time domain follows the order of first port group, second repetition.

TABLE 13

| pattern | s0 g0 | s1 g1 | s2 g0 | s3 g1 | s4 g0 | s5 g1 | s6 g0 | s7 g1 |
|---|---|---|---|---|---|---|---|---|
| | | R = 2 | | | | R = 2 | | |
| 0 | X | X | X | X | | | | |
| 1 | | | | | | | | |
| 2 | | | | | X | X | X | X |
| 3 | | | | | | | | |

Embodiment 5: Framework for SRS

A UE determines at least one of the following parameters for a SRS port, or a SRS port group: a starting symbol (symbol+slot index), a number of allocated symbols, a number of repetitions, a Comb-offset, or a CS-offset.

Note that the Comb-offset or CS-offset includes initial value of Comb/CS and Comb/CS pattern, and the determination can be based on configuration from network.

The starting symbol (symbol+slot index) can be configured for each port group, or for all port group. If configured for all port groups, the starting symbol is used for the first port group, and the starting symbol for second port group can be the symbol after the number of allocated symbols for the first port group, then the next symbol is the starting symbol for the third port group, and so on.

The number of allocated symbols can be the same for all port groups or configured as one value for all port groups. The starting symbols can be configured for each port group independently. The symbols of each port groups can be continuous, or not continuous.

The allocated symbols for a port group should be within a slot. The allocated symbols for different port groups can be within a slot or in different slots.

The number of repetitions can be same for all port groups or configured as one value for all port groups.

The Comb-offset can be same for all port groups, or a comb-offset is configured for a SRS, and different Comb-offset is determined for each port group.

The CS-offset can be same for all port groups, or a CS-offset is configured for a SRS, and different CS-offset is determined for each port group.

Parameter combination for time-domain includes one of more of the following:

A starting symbol (symbol+slot index) (e.g., for a group or for a SRS resource), a number of allocated OFDM symbols for a group, a number of SRS-port-groups (candidate value: 1, 2, 4, 8); a TDM group; a time-domain gap between neighboring SRS-port-group (candidate value: 1, 2, . . . ), a total number of allocated OFDM symbols, a RepNum (some candidate values (e.g., >=8) are excluded for some cases), or a Comb-offset/CS-offset which is determined as a function of 'group-index' or 'slot/symbol-index'.

The UE determines the parameter for the SRS port or the SRS port group of the SRS resource according to one of more of the values, such values are configured by a network to a UE, e.g., via RRC signaling, or MAC CE, or a DCI, or determined by a UE according to parameters configured by a network to a UE. The values are:

A number of allocated symbols for the SRS resource, or for all SRS port groups or all SRS ports.

A repetition factor.

A TDM factor, the TDM factor M is determined by a number of symbols of SRS divided by a repetition factor R, an SRS resource configured with N ports, can be configured with a TDM factor M.

A number of SRS port groups.

A number of allocated symbols for a SRS port group, or for a TDM group,

A starting symbol for the SRS resource (one value is configured for an SRS resource), for an SRS port group (per port group configured, this parameter for port groups in same symbol can be same. Different port groups may occupy consecutive or non-consecutive symbols), or for a TDM group (per TDM group configured. Different TDM groups may occupy consecutive or non-consecutive symbols).

A time-domain gap between SRS port groups corresponding to different TDM groups, if different TDM groups (port groups) occupy non-consecutive symbols, this parameter is the gap in symbols and/or slots for the non-consecutive symbols of different TDM groups. The gap can be also the symbol difference between the starting symbols of the TDM groups.

A comb offset parameter for the SRS resource (one parameter is configured for the SRS resource, and one or more comb offsets can be determined for the plurality of SRS ports or SRS port groups), for a SRS port group (per SRS port group configuration, different SRS port groups can have same or different values of such parameter), or for a TDM group (per TDM group configuration. Different TDM groups can have same or different values of such parameter).

A CS offset parameter for the SRS resource (one parameter is configured for the SRS resource, and different TDM groups or different SRS port groups can have same or different CS offset sets), for a SRS port group (per SRS port group configuration, different SRS port groups can have same or different values of such parameter), or for a TDM group (per TDM group configuration. Different TDM groups can have same or different values of such parameter).

UE then transmits parameters to indicate its capability.

Embodiment 6: Power Scaling Factor for SRS

One example embodiment as: for SRS, a UE splits a linear value $\hat{P}_{SRS,b,f,c}(i, q_s, l)$ of the transmit power $P_{SRS,b,f,c}(i, q_s, l)$ on active UL BWP b of carrier f of serving cell c equally across the configured antenna ports for SRS.

SRS transmits power is determined according to at least one of: a number of ports in one symbol, a number of ports in a port group, a number of ports configured for SRS divided by a number of port groups, or a number of ports configured for SRS divided by (number of symbols/R).

The number of ports in one symbol, the number of ports in a port group, the number of port groups, or the number of symbols is received by UE from a network or is determined by UE according to configuration from network.

For SRS, a UE splits a linear value $\hat{P}_{SRS,b,f,c}(i, q_s, l)$ of the transmit power $P_{SRS,b,f,c}(i, q_s, l)$ on active UL BWP b of carrier f of serving cell c equally across a number of antenna ports in one symbol for SRS, a number of ports in a port group for SRS, a number of ports configured for SRS divided by a number of port groups, or a number of ports configured for SRS divided by (number of symbols/R).

Embodiment 7: For 8Tx Port SRS

A UE is configured by a network with at least one SRS resource. An SRS resource configured with N ports, can be configured with a TDM factor M, or can be determined a TDM factor M. The TDM factor M is determined by a number of symbols of SRS divided by a repetition factor R. TDM factor M refers to M TDM groups (symbol groups). In a group, one or more symbols corresponding to same port indexes set.

If TDM factor M>1, the N, e.g., N=8, ports are equally split into M groups corresponding to M symbol groups. For each group, FD (frequency domain) resources and/or CD (code domain) resources for the ports in the group can follow legacy scheme (the following scheme 1), or ports in different groups can have same or different FD and/or CD resources (the following scheme 2).

The SRS resource can be configured with one or more comb offset parameters. The more than one comb offset parameters can be used to determine more than one comb offset for more than one groups of ports. The SRS resource can be configured with one or more CS offset parameters. The more than one CS offset parameters can be used to determine more than one CS offset for more than one groups of ports.

For example, UE determines the parameter for the SRS port or the SRS port group of the SRS resource according to different SRS port groups in different symbols correspond to a same CS offset set or different CS offset sets based on the TDM factor.

Further, different SRS port groups in different symbols correspond to a same CS offset set or different CS offset sets based on the TDM factor comprises different SRS port groups in different symbols correspond to a same CS offset set in response to TDM factor being larger than 1, different SRS port groups in different symbols correspond to a different CS offset set according to port index in response to TDM factor being larger than 1, or different SRS port groups in different symbols correspond to a different CS offset sets in response to TDM factor being equal to 1.

In another example, UE determines the parameter for the SRS port or the SRS port group of the SRS resource according to different SRS port groups in different symbols correspond to a same comb offset or same comb offset set or different comb offsets or different comb offset sets based on the TDM factor.

Further different SRS port groups in different symbols correspond to a same comb offset or same comb offset set or different comb offsets or different comb offset sets based on the TDM factor comprises different SRS port groups in different symbols correspond to a same comb offset or comb offset set in response to TDM factor being larger than 1, different SRS port groups in different symbols correspond to a different comb offsets or different comb offset sets according to port index in response to TDM factor being larger than 1, or different SRS port groups in different symbols correspond to a different comb offsets of different comb offset sets in response to TDM factor being equal to 1.

Details are described as follows.

Scheme 1: Reuse legacy scheme of comb and CS resource allocation for 2 ports or 4 ports on one OFDM symbol and repeat the comb and CS pattern on different symbols, as shown in table 14. OFDM symbol can be simplified as symbol.

TABLE 14

| 1st symb/port group #1 | | | 2nd symb/port group #2 | | |
|---|---|---|---|---|---|
| SRS port | Cyclic shift | Comb offset | SRS port | Cyclic shift | Comb offset |
| 1000 | 0 | 0 | 1004 | 0 | 0 |
| 1001 | 2 | 0 | 1005 | 2 | 0 |
| 1002 | 4 | 0 | 1006 | 4 | 0 |
| 1003 | 6 | 0 | 1007 | 6 | 0 |

For example, assuming #symbols=2, and R=1, then M=2, and 8 port are split into 2 groups. Each group has 4 ports. The legacy scheme of determining FD resources and/or CD resources for 4 ports SRS can be used for 4 ports SRS in each group.

In another example, assuming #symbols=8, and R=2, then M=4, and 8 port are split into 4 groups. Each group has 2 ports. The legacy scheme of determining FD resources and/or CD resources for 2 ports can be used for 2 ports in each group.

Scheme 2: Ports on different symbols have same or different CS and same or different comb offsets, aligned with comb and CS resource for 8 ports in one symbol, i.e., a function of port index, no matter in one or more symbols. Table 15 shows 8 ports in one symbol.

TABLE 15

| SRS port | Cyclic shift | Comb offset |
|---|---|---|
| 1000 | 0 | 0 |
| 1001 | 2 | 0 |
| 1002 | 4 | 0 |
| 1003 | 6 | 0 |
| 1004 | 0 | 1 |
| 1005 | 2 | 1 |
| 1006 | 4 | 1 |
| 1007 | 6 | 1 |

Table 16 shows 8 ports in two symbols.

TABLE 16

| $1^{st}$ symb/port group #1 | | | $2^{nd}$ symb/port group #2 | | |
|---|---|---|---|---|---|
| SRS port | Cyclic shift | Comb offset | SRS port | Cyclic shift | Comb offset |
| 1000 | 0 | 0 | 1004 | 0 | 1 |
| 1001 | 2 | 0 | 1005 | 2 | 1 |
| 1002 | 4 | 0 | 1006 | 4 | 1 |
| 1003 | 6 | 0 | 1007 | 6 | 1 |

If TDM factor M=1, all the 8 ports are allocated in each symbol allocated to the SRS.

For comb ($K_{TC}$)=2, 4, and 8, corresponding CS max value 8, 12, and 6, there can be one combination of FD resources and CD resources, i.e., first combination in the table, or the second combination may be possible in addition to the first combination, as shown in Table 17.

TABLE 17

| $K_{TC}$ | $n_{SRS}^{cs,max}$ | First combination | | Second combination | |
|---|---|---|---|---|---|
| | | FD (#. of comb offset) | CD (#. of CS offset) | FD (#. of comb offset) | CD (#. of CS offset) |
| 2 | 8 | 2 | 4 | 1 | 8 |
| 4 | 12 | 2 | 4 | 4 | 2 |
| 8 | 6 | 4 | 2 | | |

Value of comb ($K_{TC}$) indicates a maximum number of comb offsets. E.g., for comb ($K_{TC}$)=2, it means there are at most 2 comb offsets for FD resources, e.g., one comb offset indicating even indexed REs, and the other comb offset indicating odd indexed REs. A group of ports can be determined with one comb offset. Each RE determined by the comb offset for the group of ports can be shared by all the ports in the group of ports. The ports share the same REs, i.e., with the same comb offset are differentiated by a respective CS. Comb offset can be identified by comb index.

Value of max CS $$(n_{SRS}^{cs,max})$$

indicates a maximum number of cyclic shifts.

$$n_{SRS}^{cs,max} = 8$$

can provide at most 8 CS offsets, and can be used for at most 8 ports, and each port corresponds to one CS offset. In reality, only less than 8 ports, e.g., 4 or 2 ports occupy 4 or 2 CS offsets respectively. The ports can be differentiated with better performance by larger distance of CS offsets. E.g., 2 ports with 2 consecutive CS offsets does not perform as well as 2 ports with 2 CS offsets with a distance with 4. The distance can also be a gap, which means a difference between indexes of the 2 CS offsets. A cyclic shift represents a CD resource and can be also called cyclic shift offset (CS offset). Cyclic shift is identified by cyclic shift index (CS index).

Accordingly, some preferred embodiments may use the following solutions.

1. A method of wireless communication, as disclosed in FIG. 9, including receiving, by a wireless communication device, from a network device, a configuration of a sounding reference signal (SRS) resource with a plurality of ports or port groups (902); determining, by the wireless communication device, a parameter for an SRS port or an SRS port group of the SRS resource (904); and wherein the parameter comprises at least one of: one or more symbols, a comb offset, or a cyclic shift (CS) offset. Additional details and examples are discussed with respect to embodiment 5.

2. The method of solution 1, wherein the wireless communication device further determines the parameter for the SRS port or the SRS port group of the SRS resource according to one of more of the following values: a number of allocated symbols for the SRS resource, for all SRS port groups, or all SRS ports, a repetition factor, a TDM factor, a number of SRS port groups, a number of allocated symbols for a SRS port group, or for a TDM group, a starting symbol for the SRS resource, for a SRS port group, or for a TDM group, a time-domain gap between SRS port groups corresponding to different TDM groups, a comb offset parameter for the SRS resource, for a SRS port group, or for a TDM group, or a CS offset parameter for the SRS resource, for a SRS port group, or for a TDM group.

3. The method of solution 1, wherein the wireless communication device further determines a transmission power for the SRS port or the SRS port group of the SRS resource according to at least one of: a number of SRS ports in one symbol, a number of SRS ports in an SRS port group, a ratio of a number of SRS ports to a number of SRS port groups, or a ratio of a number of SRS ports to a ratio of a number of symbols to a repetition.

4. The method of solution 3, wherein the wireless communication device equally splits the transmission power among a number of antenna ports in one symbol for the SRS resource, or a number of SRS ports in an SRS port group for the SRS resource.

5. The method of solution 1, wherein the plurality of SRS ports are grouped into a plurality of SRS port groups.

6. The method of solution 5, wherein the SRS ports in an SRS port group have a same value for at least one of the following parameters: a time domain parameter, or a comb offset.

7. The method of solution 1, wherein a relation of an index of an SRS port $p_i$ and an index of an SRS port group $g_i$ are determined according to: $g_i = \lfloor p_i/G \rfloor$, or $g_i = p_i$ mod G; wherein G indicates a number of SRS port groups.

8. The method of solution 7, wherein the relation of the $p_i$ and the $g_i$ are further specified to at least one of the following: $p_i$ of $\{0, 1, 4, 5\}$ corresponds to $g_i$ of 0, and $p_i$ of $\{2, 3, 6, 7\}$ corresponds to $g_i$ of 1, $p_i$ of $\{0, 1, 2, 3\}$ corresponds to $g_i$ of 0, and $p_i$ of $\{4, 5, 6, 7\}$ corresponds to $g_i$ of 1, $p_i$ of $\{0, 4\}$, $p_i$ of $\{1, 5\}$, $g_i$ of $\{2, 6\}$, $p_i$ of $\{3, 7\}$ correspond to $g_i$ of 0, 1, 2, and 3 respectively, or $p_i$ of $\{0, 1\}$, $p_i$ of $\{2, 3\}$, $p_i$ of $\{4, 5\}$, $p_i$ of $\{6, 7\}$ correspond to $g_i$ of 0, 1, 2, and 3 respectively.

9. The method of solution 2, wherein a relation between the repetition factor and the SRS port group is determined by: a number of the repetition factor continuous symbols corresponding to an SRS port group; a number of non-repeated symbols for all the SRS port groups corresponding to a repetition according to the repetition factor, or a number of part of the repetition factor continuous symbols corresponding to one or more SRS port groups.

10. The method of solution 1, wherein the wireless communication device further determines the parameter for the SRS port or the SRS port group of the SRS resource according to: wherein different SRS port groups in different symbols correspond to a same CS offset set, or wherein different SRS port groups in different symbols correspond to a different CS offset set.

11. The method of solution 2, wherein the wireless communication device further determines the parameter for the SRS port or the SRS port group of the SRS resource according to: wherein different SRS port groups in different symbols correspond to a same CS offset set or different CS offset sets based on the TDM factor.

12. The method of solution 11, wherein different SRS port groups in different symbols correspond to a same CS offset set or different CS offset sets based on the TDM factor further comprises: wherein different SRS port groups in different symbols correspond to a same CS offset set in response to TDM factor being larger than 1, wherein different SRS port groups in different symbols correspond to a different CS offset set according to port index in response to TDM factor being larger than 1, or wherein different SRS port groups in different symbols correspond to a different CS offset sets in response to TDM factor being equal to 1.

13. The method of solution 12, wherein the CS offset for the SRS port is determined according to at least one of: an index of a symbol of the SRS port, a local symbol index for the SRS resource in a slot, port indexes starting from 0 to a number of ports in a port group, or ports in a TDM group, an index of the SRS port, an index of an SRS port group including the SRS port, a fixed SRS port group index, a number of port groups for an SRS resource, or a number of ports in a port group.

14. The method of solution 1, wherein the wireless communication device further determines the parameter for the SRS port or the SRS port group of the SRS resource according to: wherein different SRS port groups in different symbols correspond to a same comb offset or a same comb offset set, or wherein different SRS port groups in different symbols correspond to a different comb offset or a different comb offset set.

15. The method of solution 2, wherein the wireless communication device further determines the parameter for the SRS port or the SRS port group of the SRS resource according to: wherein different SRS port groups in different symbols correspond to a same comb offset or a same comb offset set or a different comb offset or a different comb offset set based on the TDM factor.

16. The method of solution 15, wherein different SRS port groups in different symbols correspond to a same comb offset or same comb offset set or different comb offsets or different comb offset sets based on the TDM factor further comprises: wherein different SRS port groups in different symbols correspond to a same comb offset or comb offset set in response to TDM factor being larger than 1, wherein different SRS port groups in different symbols correspond to a different comb offsets or different comb offset sets according to port index in response to TDM factor being larger than 1, or wherein different SRS port groups in different symbols correspond to a different comb offsets of different comb offset sets in response to TDM factor being equal to 1.

17. The method of solution 16, wherein the comb offset or the comb offset set is determined according to at least one of: an index of a symbol of the SRS port, a local symbol index for the SRS resource in a slot, port indexes starting from 0 to a number of ports in a port group, or ports in a TDM group, an index of the SRS port, an index of an SRS port group including the SRS port, a fixed SRS port group index, a number of port groups for an SRS resource, or a number of ports in a port group.

18. The method of solution 1, wherein the wireless communication device further determines a counter of the SRS resource to be increased by one for every R multiply by $$N_{pg}^{SRS}$$

symbols; wherein R indicates a number of repetition and $$N_{pg}^{SRS}$$

indicates a number of port groups.

19. The method of solution 18, wherein the counter of the SRS resource corresponds to a frequency hopping pattern; or a frequency hopping pattern that is used for SRS transmission in R multiple by $$N_{pg}^{SRS}$$

symbols.

20. The method of solution 1, wherein the wireless communication device further determines a counter of the SRS resource to be increased by one for every R symbol; wherein R indicates a number of repetitions.

21. The method of solution 20, wherein the counter of the SRS resource corresponds to a frequency hopping pattern; or different SRS port groups in different symbols correspond to different frequency hopping patterns.

22. A method of wireless communication, as disclosed in FIG. 10, including transmitting, to a wireless communication device, from a network device, a configuration of a sounding reference signal (SRS) resource with a plurality of ports or port groups (1002); determining, by the wireless communication device, a parameter for an SRS port or an SRS port group of the SRS resource (1004); and wherein the parameter comprises at least one of: one or more symbols, a comb offset, or a cyclic shift (CS) offset. Additional details and examples are discussed with respect to embodiment 5.

23. The method of solution 22, wherein the wireless communication device further determines the parameter for the SRS port or the SRS port group of the SRS resource according to one of more of the following values: a number of allocated symbols for the SRS resource, for all SRS port groups, or all SRS ports, a repetition factor, a TDM factor, a number of SRS port groups, a number of allocated symbols for a SRS port group, or for a TDM group, a starting symbol for the SRS resource, for a SRS port group, or for a TDM group, a time-domain gap between SRS port groups corresponding to different TDM groups, a comb offset parameter for the SRS resource, for a SRS port group, or for a TDM group, or a CS offset parameter for the SRS resource, for a SRS port group, or for a TDM group.

24. The method of solution 22, wherein the wireless communication device further determines a transmission power for the SRS port or the SRS port group of the SRS resource according to at least one of: a number of SRS ports in one symbol, a number of SRS ports in an SRS port group, a ratio of a number of SRS ports to a number of SRS port groups, or a ratio of a number of SRS ports to a ratio of a number of symbols to a repetition.

25. The method of solution 24, wherein the wireless communication device equally splits the transmission power among a number of antenna ports in one symbol for the SRS resource, or a number of SRS ports in an SRS port group for the SRS resource.

26. The method of solution 22, wherein the plurality of SRS ports are grouped into a plurality of SRS port groups.

27. The method of solution 26, wherein the SRS ports in an SRS port group have a same value for at least one of the following parameters: a time domain parameter, or a comb offset.

28. The method of solution 22, wherein a relation of an index of an SRS port $p_i$ and an index of an SRS port group $g_i$ are determined according to: $g_i = \lfloor p_i/G \rfloor$, or $g_i = p_i \bmod G$; wherein G indicates a number of SRS port groups.

29. The method of solution 28, wherein the relation of the pi and the gi are further specified to at least one of the following: $p_i$ of {0, 1, 4, 5} corresponds to $g_i$ of 0, and $p_i$ of {2, 3, 6, 7} corresponds to $g_i$ of 1, $p_i$ of {0, 1, 2, 3} corresponds to $g_i$ of 0, and $p_i$ of {4, 5, 6, 7} corresponds to $g_i$ of 1, $p_i$ of {0, 4}, $p_i$ of {1, 5}, $g_i$ of {2, 6}, $p_i$ of {3, 7} correspond to $g_i$ of 0, 1, 2, and 3 respectively, or $p_i$ of {0, 1}, $p_i$ of {2, 3}, $p_i$ of {4, 5}, $p_i$ of {6, 7} correspond to $g_i$ of 0, 1, 2, and 3 respectively.

30. The method of solution 23, wherein a relation between the repetition factor and the SRS port group is determined by: a number of the repetition factor continuous symbols corresponding to an SRS port group; a number of non-repeated symbols for all the SRS port groups corresponding to a repetition according to the repetition factor, or a number of part of the repetition factor continuous symbols corresponding to one or more SRS port groups.

31. The method of solution 22, wherein the wireless communication device further determines the parameter for the SRS port or the SRS port group of the SRS resource according to: wherein different SRS port groups in different symbols correspond to a same CS offset set, or wherein different SRS port groups in different symbols correspond to a different CS offset set.

32. The method of solution 23, wherein the wireless communication device further determines the parameter for the SRS port or the SRS port group of the SRS resource according to: wherein different SRS port groups in different symbols correspond to a same CS offset set or different CS offset sets based on the TDM factor.

33. The method of solution 32, wherein different SRS port groups in different symbols correspond to a same CS offset set or different CS offset sets based on the TDM factor further comprises: wherein different SRS port groups in different symbols correspond to a same CS offset set in response to TDM factor being larger than 1, wherein different SRS port groups in different symbols correspond to a different CS offset set according to port index in response to TDM factor being larger than 1, or wherein different SRS port groups in different symbols correspond to a different CS offset sets in response to TDM factor being equal to 1.

34. The method of solution 33, wherein the CS offset for the SRS port is determined according to at least one of: an index of a symbol of the SRS port, a local symbol index for the SRS resource in a slot, port indexes starting from 0 to a number of ports in a port group, or ports in a TDM group, an index of the SRS port, an index of an SRS port group including the SRS port, a fixed SRS port group index, a number of port groups for an SRS resource, or a number of ports in a port group.

35. The method of solution 22, wherein the wireless communication device further determines the parameter for the SRS port or the SRS port group of the SRS resource according to: wherein different SRS port groups in different symbols correspond to a same comb offset or a same comb offset set, or wherein different SRS port groups in different symbols correspond to a different comb offset or a different comb offset set.

36. The method of solution 23, wherein the wireless communication device further determines the parameter for the SRS port or the SRS port group of the SRS resource according to: wherein different SRS port groups in different symbols correspond to a same comb offset or a same comb offset set or a different comb offset or a different comb offset set based on the TDM factor.

37. The method of solution 36, wherein different SRS port groups in different symbols correspond to a same comb offset or same comb offset set or different comb offsets or different comb offset sets based on the TDM factor further comprises: wherein different SRS port groups in different symbols correspond to a same comb offset or comb offset set in response to TDM factor being larger than 1, wherein different SRS port groups in different symbols correspond to a different comb offsets or different comb offset sets according to port index in response to TDM factor being larger than 1, or wherein different SRS port groups in different symbols correspond to a different comb offsets of different comb offset sets in response to TDM factor being equal to 1.

38. The method of solution 37, wherein the comb offset or the comb offset set is determined according to at least one of: an index of a symbol of the SRS port, a local symbol index for the SRS resource in a slot, port indexes starting from 0 to a number of ports in a port group, or ports in a TDM group, an index of the SRS port, an index of an SRS port group including the SRS port, a fixed SRS port group index, a number of port groups for an SRS resource, or a number of ports in a port group.

39. The method of solution 22, wherein the wireless communication device further determines a counter of the SRS resource to be increased by one for every R multiply by $$N_{pg}^{SRS}$$

symbols; wherein R indicates a number of repetition and $$N_{pg}^{SRS}$$

indicates a number of port groups.

40. The method of solution 39, wherein the counter of the SRS resource corresponds to a frequency hopping pattern; a frequency hopping pattern that is used for SRS transmission in R multiple by $$N_{pg}^{SRS}$$

symbols.

41. The method of solution 22, wherein the wireless communication device further determines a counter of the SRS resource to be increased by one for every R symbol; wherein R indicates a number of repetitions.

42. The method of solution 41, wherein the counter of the SRS resource corresponds to a frequency hopping pattern; or different SRS port groups in different symbols correspond to different frequency hopping patterns.

43. A communication apparatus comprising a processor configured to implement a method recited in any one or more of solutions 1 to 42.

44. A computer readable medium having code stored thereon, the code, when executed, causing a processor to implement a method recited in any one or more of solutions 1 to 42.

FIG. 11 shows an example of a wireless communication system (e.g., a long term evolution (LTE), 5G or NR cellular network) that includes a BS 120 and one or more user equipment (UE) 111, 112 and 113. In some embodiments, the uplink transmissions (131, 132, 133) can include uplink control information (UCI), higher layer signaling (e.g., UE assistance information or UE capability), or uplink information. In some embodiments, the downlink transmissions (141, 142, 143) can include DCI or high layer signaling or downlink information. The UE may be, for example, a smartphone, a tablet, a mobile computer, a machine to machine (M2M) device, a terminal, a mobile device, an Internet of Things (IoT) device, and so on.

FIG. 12 is a block diagram representation of a portion of an apparatus, in accordance with some embodiments of the presently disclosed technology. An apparatus 205 such as a network device or a base station or a wireless device (or UE), can include processor electronics 210 such as a microprocessor that implements one or more of the techniques presented in this document. The apparatus 205 can include transceiver electronics 215 to send and/or receive wireless signals over one or more communication interfaces such as antenna(s) 220. The apparatus 205 can include other communication interfaces for transmitting and receiving data. Apparatus 205 can include one or more memories (not explicitly shown) configured to store information such as data and/or instructions. In some implementations, the processor electronics 210 can include at least a portion of the transceiver electronics 215. In some embodiments, at least some of the disclosed techniques, modules or functions are implemented using the apparatus 205.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described, and other implementations, enhancements, and variations can be made based on what is described and illustrated in this document.

What is claimed is:

1. A method for wireless communication, comprising:

receiving, by a wireless communication device from a network device, a configuration of a sounding reference signal (SRS) resource, wherein the configuration comprises a parameter indicating ports configured for the SRS resource, wherein the ports configured for the SRS resource are grouped into SRS port groups; and determining, by the wireless communication device, a transmit power for an SRS transmission based on a time division multiplexing (TDM) factor and a number of ports in a symbol that are associated with the SRS resource, wherein the TDM factor is based on the parameter indicating the number of ports configured for the SRS resource, and wherein the transmit power is equally split across the number of ports in a symbol that are associated with the SRS resource.

2. The method of claim 1, wherein the ports configured for the SRS resource are grouped into two SRS port groups that are mapped to two continuous symbols respectively.

3. The method of claim 1, wherein the ports configured for the SRS resource are grouped into two SRS port groups that are repeatedly mapped to every two continuous symbols respectively.

4. The method of claim 1, wherein the configuration further comprises at least one of a comb offset parameter or a parameter indicating a cyclic shift offset.

5. The method of claim 4, wherein the cyclic shift offset or the comb offset parameter for an SRS port is determined according to an index of a symbol of the SRS port, a number of ports in an SRS port group, and port indices in the SRS port group.

6. The method of claim 1, wherein different SRS port groups in different symbols correspond to a same cyclic shift offset set or a same comb offset set based on the TDM factor.

7. The method of claim 1, wherein, upon frequency hopping being enabled, a counter that counts a number of SRS transmissions is given as $$n_{SRS} = \lfloor l'/(R*N_{pg}^{SRS}) \rfloor$$

within a slot in which $$N_{symb}^{SRS}$$

symbol SRS resource is transmitted, wherein l' is a symbol index of the SRS transmission in the slot, wherein $$N_{pg}^{SRS}$$

is equal to a number of the SRS port groups, and wherein R is a repetition factor if the repetition factor configured, otherwise $$R = N_{symb}^{SRS}.$$

8. A method for wireless communication, comprising:

transmitting, by a network device, a configuration of a sounding reference signal (SRS) resource to a wireless communication device, wherein the configuration comprises a parameter indicating ports configured for the SRS resource, wherein the ports configured for the SRS resource are grouped into SRS port groups, wherein the configuration of the SRS resource enables the wireless communication device to determine a transmit power for an SRS transmission based on a time division multiplexing (TDM) factor and a number of ports in a symbol that are associated with the SRS resource, wherein the TDM factor is based on the parameter indicating the number of ports configured for the SRS resource, and wherein the transmit power is equally split across the number of ports in a symbol that are associated with the SRS resource.

9. The method of claim 8, wherein the ports configured for the SRS resource are grouped into two SRS port groups that are mapped to two continuous symbols respectively.

10. The method of claim 8, wherein the ports configured for the SRS resource are grouped into two SRS port groups that are repeatedly mapped to every two continuous symbols respectively.

11. The method of claim 8, wherein the configuration further comprises at least one of a comb offset parameter or a parameter indicating a cyclic shift offset.

12. The method of claim 11, wherein the cyclic shift offset or the comb offset parameter for an SRS port is determined according to an index of a symbol of the SRS port, a number of ports in an SRS port group, and port indices in the SRS port group.

13. The method of claim 8, wherein different SRS port groups in different symbols correspond to a same cyclic shift offset set or a same comb offset set based on the TDM factor.

14. The method of claim 8, wherein, upon frequency hopping being enabled, a counter that counts a number of SRS transmissions is given as $$n_{SRS} = \lfloor l'/(R*N_{pg}^{SRS}) \rfloor$$

within a slot in which $$N_{symb}^{SRS}$$

symbol SRS resource is transmitted, wherein l' is a symbol index of the SRS transmission in the slot, wherein $$N_{pg}^{SRS}$$

is equal to a number of the SRS port groups, and wherein R is a repetition factor if the repetition factor configured, otherwise $$R = N_{symb}^{SRS}.$$

15. A device for wireless communication, comprising processor electronics, one or more memories and transceiver electronics, wherein the processor electronics is configured to read instructions from the one or more memories and cause the device to:

receiving, from a network device, a configuration of a sounding reference signal (SRS) resource, wherein the configuration comprises a parameter indicating ports configured for the SRS resource, wherein the ports configured for the SRS resource are grouped into SRS port groups; and determine a transmit power for an SRS transmission based on a time division multiplexing (TDM) factor and a number of ports in a symbol that are associated with the SRS resource, wherein the TDM factor is based on the parameter indicating the number of ports configured for the SRS resource, and wherein the transmit power is equally split across the number of ports in a symbol that are associated with the SRS resource.

16. The device of claim 15, wherein the ports configured for the SRS resource are grouped into two SRS port groups that are mapped to two continuous symbols respectively.

17. The device of claim 15, wherein the ports configured for the SRS resource are grouped into two SRS port groups that are repeatedly mapped to every two continuous symbols respectively.

18. The device of claim 15, wherein the configuration further comprises at least one of a comb offset parameter or a parameter indicating a cyclic shift offset.

19. The device of claim 18, wherein the cyclic shift offset or the comb offset parameter for an SRS port is determined according to an index of a symbol of the SRS port, a number of ports in an SRS port group, and port indices in the SRS port group.

20. The device of claim 15, wherein different SRS port groups for different symbols correspond to a same cyclic shift offset set or a same comb offset set based on the TDM factor.

21. The device of claim 15, wherein, upon frequency hopping being enabled, a counter that counts a number of SRS transmissions is given as $$n_{SRS} = \left\lfloor l'/(R * N_{pg}^{SRS}) \right\rfloor$$

within a slot in which $$N_{symb}^{SRS}$$

symbol SRS resource is transmitted, wherein l' is a symbol index of the SRS transmission in the slot, wherein $$N_{pg}^{SRS}$$

is equal to a number of the SRS port groups, and wherein R is a repetition factor if the repetition factor configured, otherwise $$R = N_{symb}^{SRS}.$$

22. A device for wireless communication, comprising processor electronics, one or more memories and transceiver electronics, wherein the processor electronics is configured to read instructions from the one or more memories and cause the device to:

transmitting, by a network device, a configuration of a sounding reference signal (SRS) resource, wherein the configuration comprises a parameter indicating ports configured for the SRS resource, wherein the ports configured for the SRS resource are grouped into SRS port groups, wherein the configuration of the SRS resource enables the wireless communication device to determine a transmit power for an SRS transmission based on a time division multiplexing (TDM) factor and a number of ports in a symbol that are associated with the SRS resource, wherein the TDM factor is based on the parameter indicating the number of ports configured for the SRS resource, and wherein the transmit power is equally split across the number of ports in a symbol that are associated with the SRS resource.

23. The device of claim 22, wherein the ports configured for the SRS resource are grouped into two SRS port groups that are mapped to two continuous symbols respectively.

24. The device of claim 22, wherein the ports configured for the SRS resource are grouped into two SRS port groups that are repeatedly mapped to every two continuous symbols respectively.

25. The device of claim 22, wherein the configuration further comprises at least one of a comb offset parameter or a parameter indicating a cyclic shift offset.

26. The device of claim 25, wherein the cyclic shift offset or the comb offset parameter for an SRS port is determined according to an index of a symbol of the SRS port, a number of ports in an SRS port group, and port indices in the SRS port group.

27. The device of claim 22, wherein different SRS port groups for different symbols correspond to a same cyclic shift offset set or a same comb offset set based on the TDM factor.

28. The device of claim 22, wherein, upon frequency hopping being enabled, a counter that counts a number of SRS transmissions is given as $$n_{SRS} = \left\lfloor l'/(R * N_{pg}^{SRS}) \right\rfloor$$

within a slot in which $$N_{symb}^{SRS}$$

symbol SRS resource is transmitted, wherein l' is a symbol index of the SRS transmission in the slot, wherein $$N_{pg}^{SRS}$$

is equal to a number of the SRS port groups, and wherein R is a repetition factor if the repetition factor configured, otherwise $$R = N_{symb}^{SRS}.$$

* * * * *